(12) United States Patent
Pang et al.

(10) Patent No.: US 12,505,763 B2
(45) Date of Patent: Dec. 23, 2025

(54) ATTACHMENT FIXTURE, ATTACHMENT DEVICE AND ATTACHMENT METHOD

(71) Applicants: Chengdu BOE Optoelectronics Technology Co., Ltd., Sichuan (CN); BOE Technology Group Co., Ltd., Beijing (CN)

(72) Inventors: Mengyuan Pang, Beijing (CN); Chao Yang, Beijing (CN); Yang Yang, Beijing (CN); Chuandong Liao, Beijing (CN); Yaming Wang, Beijing (CN); Liqiang Chen, Beijing (CN)

(73) Assignees: Chengdu BOE Optoelectronics Technology Co., Ltd., Sichuan (CN); Beijing BOE Technology Development Co., Ltd., Beijing (CN)

( * ) Notice: Subject to any disclaimer, the term of this patent is extended or adjusted under 35 U.S.C. 154(b) by 222 days.

(21) Appl. No.: 17/800,996

(22) PCT Filed: Nov. 12, 2021

(86) PCT No.: PCT/CN2021/130285
§ 371 (c)(1),
(2) Date: Aug. 19, 2022

(87) PCT Pub. No.: WO2022/166295
PCT Pub. Date: Aug. 11, 2022

(65) Prior Publication Data
US 2024/0194095 A1    Jun. 13, 2024

(30) Foreign Application Priority Data
Feb. 3, 2021    (CN) .......................... 202110151119.9

(51) Int. Cl.
G09F 9/30    (2006.01)

(52) U.S. Cl.
CPC .................................... *G09F 9/301* (2013.01)

(58) Field of Classification Search
CPC .................................. G09F 9/30; G09F 9/301
(Continued)

(56) References Cited

U.S. PATENT DOCUMENTS

| 11,653,458 B2* | 5/2023 | Dong | ................... | H05K 5/0217 |
| | | | | 361/807 |
| 11,706,872 B2* | 7/2023 | Shi | ....................... | H05K 1/0203 |
| | | | | 361/749 |

(Continued)

FOREIGN PATENT DOCUMENTS

| CN | 108615466 A | 10/2018 |
| CN | 110930882 A | 3/2020 |

(Continued)

OTHER PUBLICATIONS

CN 202110151119.9 first office action.
PCT/CN2021/130285 international search report and written opinion.

*Primary Examiner* — Ernesto A Grano
(74) *Attorney, Agent, or Firm* — IPro, PLLC

(57) ABSTRACT

The present disclosure provides an attachment fixture, an attachment device and an attachment method. An attachment slider for attaching a flexible display panel to a curved-surface cover plate includes: at least one rigid shape-copying plate, at least a portion of an outer surface of the shape-copying plate being a shape-copying curved surface through which the flexible display panel copies a shape of the curved-surface cover plate, an elastic buffer layer being provided on the shape-copying curved surface; and at least one rigid support plate attached to the shape-copying plate, the support plate being angled relative to the shape-copying plate by an angle.

19 Claims, 4 Drawing Sheets

(58) Field of Classification Search
USPC .......................................................... 206/100
See application file for complete search history.

(56) References Cited

U.S. PATENT DOCUMENTS

| | | | |
|---|---|---|---|
| 11,868,182 B2* | 1/2024 | Cui | G06F 1/1681 |
| 11,971,756 B2* | 4/2024 | Kim | G06F 1/1681 |
| 2008/0298083 A1* | 12/2008 | Watson | G02F 1/167 |
| | | | 362/603 |
| 2010/0246103 A1* | 9/2010 | Visser | G06F 1/1616 |
| | | | 361/679.01 |
| 2013/0216740 A1* | 8/2013 | Russell-Clarke | B21D 31/04 |
| | | | 219/121.72 |
| 2013/0222998 A1* | 8/2013 | Cho | G06F 1/1601 |
| | | | 361/679.27 |
| 2017/0072671 A1 | 3/2017 | Son et al. | |
| 2021/0007230 A1 | 1/2021 | Kang et al. | |
| 2021/0053319 A1* | 2/2021 | Xie | B32B 3/04 |
| 2021/0068273 A1* | 3/2021 | Chen | G09F 9/301 |
| 2021/0366320 A1* | 11/2021 | Wang | H10K 50/8426 |
| 2022/0126408 A1 | 4/2022 | Deng et al. | |
| 2022/0212447 A1* | 7/2022 | Xie | B32B 3/263 |
| 2022/0236773 A1* | 7/2022 | Kim | G06F 1/1652 |
| 2022/0240399 A1* | 7/2022 | Dong | H05K 5/0217 |
| 2022/0288911 A1 | 9/2022 | Mo et al. | |
| 2022/0344615 A1* | 10/2022 | Li | H01L 25/18 |
| 2023/0104021 A1* | 4/2023 | Jiang | G09F 9/301 |
| | | | 361/807 |
| 2025/0089527 A1* | 3/2025 | Zhang | G09F 9/30 |

FOREIGN PATENT DOCUMENTS

| | | |
|---|---|---|
| CN | 210271560 U | 4/2020 |
| CN | 111261046 A | 6/2020 |
| CN | 111546749 A | 8/2020 |
| CN | 111554191 A | 8/2020 |
| CN | 112150932 A | 12/2020 |
| CN | 112248607 A | 1/2021 |
| CN | 112885238 A | 6/2021 |
| IN | 110461604 A | 11/2019 |
| JP | 3211002 U | 6/2017 |

* cited by examiner

ATTACHMENT FIXTURE, ATTACHMENT DEVICE AND ATTACHMENT METHOD

CROSS-REFERENCE TO RELATED APPLICATIONS

This application is the U.S. national phase of PCT Application No. PCT/CN2021/130285 filed on Nov. 12, 2021, which claims a priority of the Chinese Patent application Ser. No. 202110151119.9 filed on Feb. 3, 2021, the entire contents of which are hereby incorporated by reference.

TECHNICAL FIELD

The present disclosure relates to the field of display technology, in particular to an attachment fixture, an attachment device, and an attachment method.

BACKGROUND

With the development of the display technology, a display product with a special shape and a curved surface has gradually become available in the market due to such characteristics as a flexible and thin display panel. In order to increase a screen-to-body ratio and meet the user experience, a surround screen is provided. In the related art, for the surround screen, a curved-surface cover plate is externally attached to a flexible display panel. However, there are some defects for an attachment scheme thereof. For example, during the attachment, a large force is applied to the display panel, so the display panel is easily broken. In addition, an attachment effect is poor, and there are residual bubbles at an arc-like region and a planar region.

SUMMARY

An object of the present disclosure is to provide an attachment fixture, an attachment device, and an attachment method, so as to improve an attachment effect of the flexible screen.

The present disclosure provides the following technical solutions.

In one aspect, the present disclosure provides in some embodiments an attachment slider for attaching a flexible display panel to a curved-surface cover plate, including: at least one rigid shape-copying plate, at least a portion of an outer surface of the shape-copying plate being a shape-copying curved surface through which the flexible display panel copies a shape of the curved-surface cover plate, an elastic buffer layer being provided on the shape-copying curved surface; and at least one rigid support plate attached to the shape-copying plate, the support plate being angled relative to the shape-copying plate by an angle.

In a possible embodiment of the present disclosure, the shape-copying curved surface of the shape-copying plate includes a first shape-copying plane and a second shape-copying plane arranged opposite to each other, and a first shape-copying arc surface connected between the first shape-copying plane and the second shape-copying plane.

In a possible embodiment of the present disclosure, the first shape-copying arc surface is a semi-circular arc surface, a semi-elliptical arc surface, a major-arc surface or a major-arc elliptical surface.

In a possible embodiment of the present disclosure, the shape-copying curved surface of the shape-copying plate further includes a second shape-copying arc surface at an edge of the second shape-copying plane away from the first shape-copying arc surface.

In a possible embodiment of the present disclosure, the second shape-copying arc surface is a minor-arc surface or a minor-arc elliptical surface.

In a possible embodiment of the present disclosure, the support plate is connected to the first shape-copying plane and is formed integrally with the shape-copying plate.

In a possible embodiment of the present disclosure, an angle between the support plate and the shape-copying plate is 90°±10°.

In a possible embodiment of the present disclosure, a through hole penetrating through the support plate is formed at a position where the shape-copying plate is connected to the support plate, and when a bearing film is spread out on the shape-copying curved surface of the shape-copying plate, one end of the bearing film passes through the through hole and spreads out on the first shape-copying plane.

In a possible embodiment of the present disclosure, the support plate is provided with a connection hole through which the support plate is connected to a driving mechanism for driving the support plate to move.

In another aspect, the present disclosure provides in some embodiments an attachment device for attaching a flexible display panel to a curved-surface cover plate, including: a bearing film, the flexible display panel being attached onto one surface of the bearing film; a cover plate bearing member configured to bear and fix the curved-surface cover plate; the above-mentioned attachment slider; and a driving mechanism for driving the attachment slider to move.

In a possible embodiment of the present disclosure, the shape-copying curved surface of the shape-copying plate includes a first shape-copying plane and a second shape-copying plane arranged opposite to each other, and a first shape-copying arc surface connected between the first shape-copying plane and the second shape-copying plane. A through hole penetrating through the support plate is formed at a position where the shape-copying plate is connected to the support plate, the bearing film supported on the first shape-copying plane extends through the through hole, the flexible display panel is attached to the bearing film, and the bearing film spreads out on the first shape-copying plane after passing through the through hole. The attachment device further includes a first clamping member and a second clamping member, the bearing film includes a feeding end and a receiving end, the bearing film is configured to be spread out and supported on the shape-copying curved surface of the shape-copying plate, the feeding end extends through the through hole and is clamped by the first clamping member, and the receiving end is clamped by the second clamping member.

In yet another aspect, the present disclosure provides in some embodiments an attachment method for attaching a flexible display panel to a curved-surface cover plate through the above-mentioned attachment device, including: enabling the curved-surface cover plate to be born and fixed on a cover plate bearing member; enabling the bearing film to which the flexible display panel is attached on a shape-copying curved surface of a shape-copying slider; aligning the shape-copying slider with the curved-surface cover plate so that a surface of the bearing film to which the flexible display panel is attached faces an inner surface of the curved-surface cover plate; and controlling the shape-copying slider to move so that the flexible display panel is attached to the curved-surface cover plate.

The present disclosure has the following beneficial effects.

According to the attachment fixture, the attachment device and the attachment method in the embodiments of the present disclosure, the attachment slider includes at least one shape-copying plate and at least one support plate. When the flexible display panel is attached to the curved-surface cover plate, the bearing film to which the flexible display panel is attached is spread out and supported on the shape-copying curved surface of the shape-copying slider, and the shape-copying slider is aligned with the curved-surface cover plate so that the surface of the bearing film to which the flexible display panel is attached faces the inner surface of the curved-surface cover plate. The shape-copying slider is controlled to move on the inner surface of the curved-surface cover plate so as to attach the flexible display panel to the curved-surface cover plate.

According to the attachment slider in the embodiments of the present disclosure, the shape-copying plate and the support plate are both made of a rigid material, and the support plate is connected to the shape-copying plate. The support plate functions as to support the shape-copying plate during the sliding of the attachment slider, so as to increase the rigidity of the shape-copying plate, thereby to improve the stability during the sliding, and prevent the occurrence of defects due to insufficient rigidity of the slider during the attachment. In addition, the elastic buffer layer is arranged on the shape-copying curved surface of the shape-copying plate, so it is able to prevent the flexible display panel from being damaged due to the deformation of the elastic buffer layer.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "include" or "including" intends to indicate that an element or object before the word contains an element or object or equivalents thereof listed after the word, without excluding any other element or object. Such words as "connect/connected to" or "couple/coupled to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

The related art will be described before the description about the present disclosure.

In the related art, a flexible display panel is attached to a curved-surface cover plate through a roller and a slider. However, the roller is easily elastically deformed due to its sufficient rigidity, and at this time, a large force is applied to an edge of the flexible display panel, and thereby bubbles easily occur and the flexible display panel is easily damaged. In addition, due to a small inner space of the curved-surface cover plate, the flexible display panel may be in contact with the curved-surface cover plate in advance, an adhesive material may easily be peeled off, and it is impossible to perform the alignment.

Figure 1:
FIG. 1 is a schematic view showing a surround screen.
Figure 2:
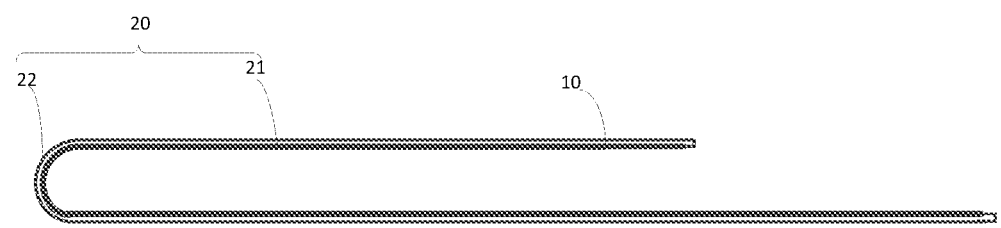
FIG. 2 is another schematic view showing the surround screen.
Figure 3:
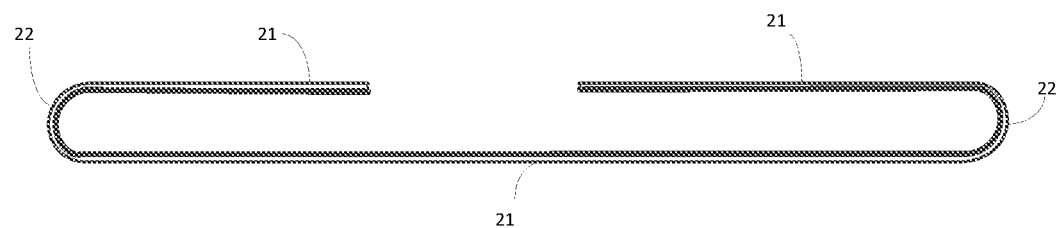
FIG. 3 is yet another schematic view showing the surround screen.

In particular, FIGS. 1 to 3 show the curved-surface cover plate of a surround screen. The curved-surface cover plate is of such a structure as to surround the flexible display panel partially or completely. During the attachment, it is very difficult to attach the curved-surface cover plate to the flexible display panel due to a small inner space of the curved-surface cover plate.

An object of the present disclosure is to provide an attachment fixture and an attachment method, so as to improve an attachment effect for a flexible display panel, especially a surround screen.

As shown in FIGS. 1 to 3, the present disclosure provides in some embodiments an attachment fixture for attaching a flexible display panel 10 to a rigid curved-surface cover plate 20. The curved-surface cover plate 20 includes at least two planar regions 21 and at least one curved region 22, that is, the flexible display panel includes at least two planar regions 21 and at least one curved region 22.

Taking a surround screen as an example, as shown in FIGS. 1 to 3, the surround screen may be of various forms, namely, the curved region 22 and the planar region 21 may be arranged in several ways. For example, as shown in FIG. 2, the quantity of planar regions 21 is only two, the quantity of curved regions 22 is only one, and the curved region 22 is arranged between the two planar regions 21. Alternatively, as shown in FIG. 1, the quantity of planar regions 21 is at least two, the quantity of curved regions 22 is at least two, at least one curved region 22 is arranged between two adjacent planar regions 21, and at least one curved region 22 is located at an edge of one of the planar regions 21. Alternatively, as shown in FIG. 3, the quantity of planar regions 21 is at least three, the quantity of curved regions 22 is at least two, and one curved region 22 is arranged between two adjacent planar regions 21. Of course, the above is for illustrative purposes only, and in actual use, the form of the surround screen is not limited thereto.

Referring to FIGS. 4 to 8, the present disclosure provides in some embodiments an attachment slider for attaching a flexible display panel 10 to a curved-surface cover plate 20. The attachment slider includes at least one rigid shape-copying plate 100 and at least one rigid support plate 200, at least a portion of an outer surface of the shape-copying plate 100 is a shape-copying curved surface through which the flexible display panel 10 copies a shape of the curved-surface cover plate 20, an elastic buffer layer 300 is provided on the shape-copying curved surface, the support plate 200 is connected to the shape-copying plate 100, and the support plate 200 is angled relative to the shape-copying plate 100 by an angle α.

According to the attachment slider in the embodiments of the present disclosure, when the flexible display panel 10 is attached to the curved-surface cover plate 20, a bearing film 400 to which the flexible display panel 10 is attached is spread out and supported on the shape-copying curved surface of the shape-copying plate 100, and then the shape-copying plate 100 is aligned with the curved-surface cover plate 20 so that a surface of the bearing film 400 to which the flexible display panel 10 is attached faces an inner surface of the curved-surface cover plate 20, that is, the attachment slider is placed in an inner space of the curved-surface cover plate 20. Then, the shape-copying slider is controlled to move on the inner surface of the curved-surface cover plate 20, so as to attach the flexible display panel 10 to the curved-surface cover plate 20.

According to the attachment slider in the embodiments of the present disclosure, the shape-copying plate 100 and the support plate 200 are both made of a rigid material, and the support plate 200 is connected to the shape-copying plate 100. The support plate 200 functions as to support the shape-copying plate 100 during the sliding of the attachment slider, so as to increase the rigidity of the shape-copying plate 100, thereby to improve the stability during the sliding and prevent the occurrence of defects due to the insufficient rigidity of the slider. In addition, the elastic buffer layer 300 is formed on the shape-copying curved surface of the shape-copying plate 100, so as to prevent the flexible display panel 10 from being damaged through the deformation of the elastic buffer layer during the attachment.

Figure 4:
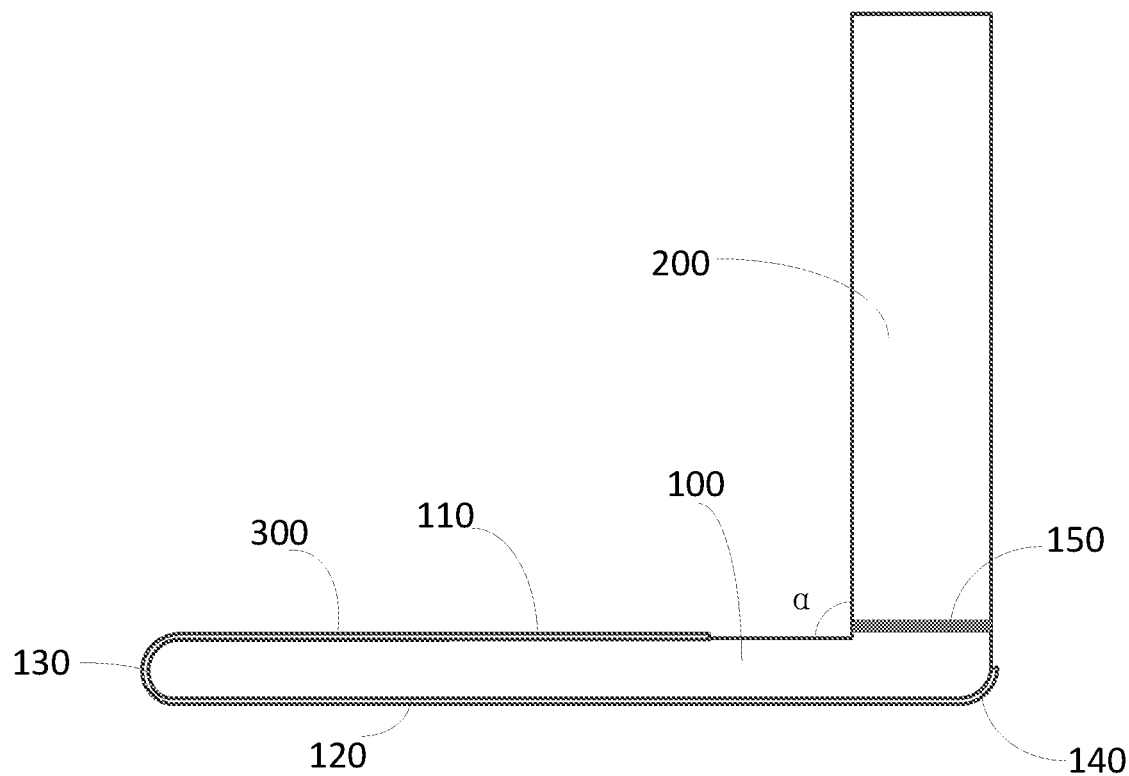
FIG. 4 is a schematic view showing an attachment slider according to one embodiment of the present disclosure.
Figure 5:
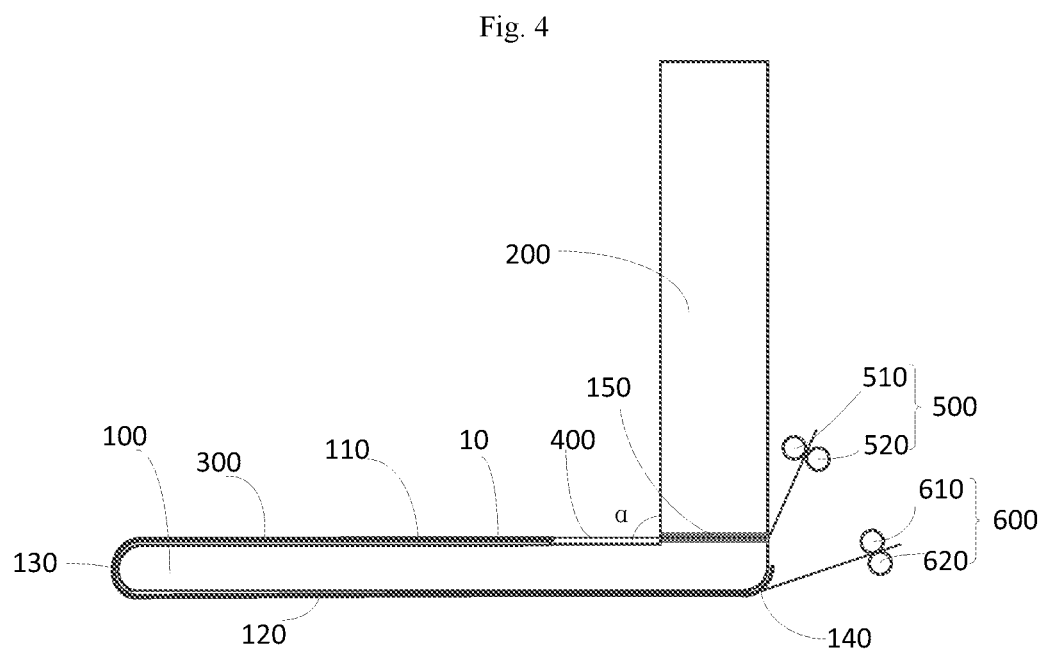
FIG. 5 is a schematic view showing a situation where a bearing film is supported on the attachment slider according to one embodiment of the present disclosure.

Referring to FIG. 4, in some embodiments of the present disclosure, the shape-copying curved surface of the shape-copying plate 100 includes a first shape-copying plane 110 and a second shape-copying plane 120 arranged opposite to each other, and a first shape-copying arc surface 130 connected between the first shape-copying plane 110 and the second shape-copying plane 120. In this way, the first shape-copying plane 110 and the second shape-copying plane 120 slide to be attached to two parallel planar regions 21 of the surround screen respectively, and the first shape-copying arc surface is attached to the curved region 22 of the surround screen.

Figure 6:
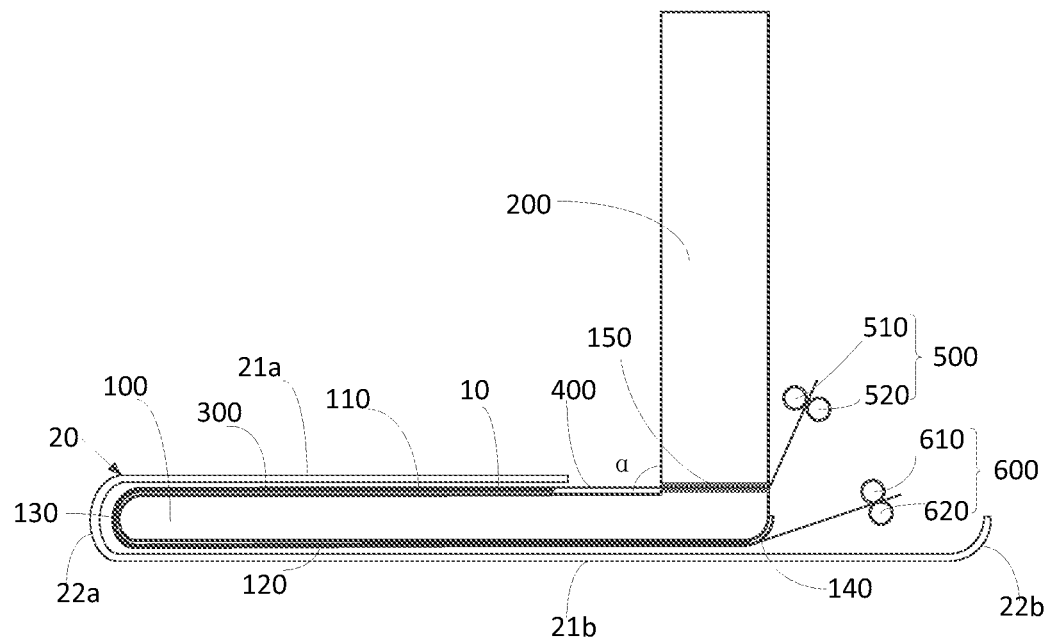
FIG. 6 is a schematic view showing a situation where the attachment slider is attached to the surround screen in FIG. 1 according to one embodiment of the present disclosure.

Taking the 180° surround screen in FIG. 1 as an example, when the attachment slider slides to be attached to the flexible display panel 10, as shown in FIG. 6, the curved-surface cover plate 20 includes a first planar region 21a and a second planar region 21b parallel to each other, and a first curved region 22a connected between the first planar region 21a and the second planar region 21b. The first shape-copying plane 110 slides to be attached to the first planar region 21a of the surround screen, the second shape-copying plane 120 slides to be attached to the second planar region 21b of the surround screen, and the first shape-copying arc surface 130 is attached to the first curved region 22a.

In some embodiments of the present disclosure, the surround screen is a 180° surround screen, i.e., the first planar region 21a and the second planar region 21b are parallel to each other, the first curved region 22 has a semi-circular arc surface, a semi-elliptical surface, a major-arc surface or a major-arc elliptical surface, and correspondingly, the first shape-copying arc surface 130 is a semi-circular arc surface, a semi-elliptical arc surface, an major-arc surface or a major-arc elliptical surface.

It should be appreciated that, a central angle of the first shape-copying arc surface 130 is less than or equal to a central angle of the first curved region 22a, a radius of an arc of the first shape-copying arc surface 130 is less than or equal to a radius of an arc of the first curved region 22a, and a difference in the radiuses is determined according to such parameters as a thickness of the curved-surface cover plate 20 and a thickness of the flexible display panel 10.

Of course, it should be appreciated that, for the other types of surround screen, for example, when the first planar region 21a is not parallel to the second planar region 21b and the first curved region 22a has a minor-arc surface, the shape-copying curved surface of the shape-copying plate 100 may be adjusted adaptively. For example, the first shape-copying plane 110 is not parallel to the second shape-copying plane 120, i.e., there is an angle α between them, and this angle α is equal to the angle α between the first planar region 21a and the second planar region 21b. The central angle of the first shape-copying arc surface 130 is equal to the central angle of the first curved region 22a, and the radius of the arc of the first shape-copying arc surface 130 is smaller than the radius of the arc of the first curved region 22a.

Furthermore, in some embodiments of the present disclosure, as shown in FIG. 6, the shape-copying curved surface of the shape-copying plate 100 further includes a second shape-copying arc surface 22b on an edge of the second shape-copying plane 120 away from the first shape-copying arc surface 130. In this way, the first shape-copying plane 110 and the second shape-copying plane 120 slide to be attached to the two parallel planar regions 21 of the surround screen, the first shape-copying arc surface is attached to one curved region of the surround screen, and the second shape-copying arc surface is attached to another curved region of the surround screen.

Taking the surround screen in FIG. 2 as an example, when the attachment slider slides to be attached to the flexible display panel 10, as shown in FIG. 6, the curved-surface cover plate 20 includes a first planar region 21a and a second planar region 21b parallel to each other, a first curved region 22a connected between the first planar region 21a and the second planar region 21b, and a second curved region 22b connected to an edge of the second planar region 21b away from the first curved region 22a. The first shape-copying plane 110 slides to be attached to the first planar region 21a of the surround screen, the second shape-copying plane 120 slides to be attached to the second planar region 21b of the surround screen, the first shape-copying arc surface 130 is attached to the first curved region 22a, and the second shape-copying arc surface 140 is attached to the second curved region 22b.

In some embodiments of the present disclosure, the surround screen is a 180° surround screen, namely, the first planar region 21a and the second planar region 21b are parallel to each other, the first curved region 22a has a semi-circular arc surface, a semi-elliptical arc surface, a major-arc surface or a major-arc elliptical surface, and correspondingly, the first shape-copying arc surface 130 has a semi-circular surface, a semi-elliptical surface, a major-arc surface or a major-arc elliptical surface. The second curved region 22b has a minor-arc surface or a minor-arc elliptical surface, and correspondingly, the second shape-copying arc surface 140 has a minor-arc surface or a minor-arc elliptical surface.

It should be appreciated that, a central angle of the second shape-copying arc surface 140 is less than or equal to a central angle of the second curved region 22b, a radius of an arc of the second shape-copying arc surface 140 is less than a radius of an arc of the second curved region 22b, and a difference in the radiuses is determined according to such parameters as a thickness of the curved-surface cover plate 20 and a thickness of the flexible display panel 10.

Furthermore, in some embodiments of the present disclosure, as shown in FIG. 4, the support plate 200 is attached to the first shape-copying plane 110 and is formed integrally with the shape-copying plate 100.

In this way, the support plate 200 mainly functions as to support the shape-copying plate 100 during the sliding, and it is connected to a driving mechanism for driving the attachment slider to slide. The support plate 200 and the shape-copying plate 100 are formed integrally, so as to increase the rigidity of the shape-copying plate 100 during the sliding, thereby to prevent the occurrence of such defects as bubbles caused when the shape-copying plate 100 is deformed due to an uneven force applied thereto.

It should be appreciated that, the support plate 200 and the shape-copying plate 100 are made of metal or any other rigid materials.

Further, as shown in FIG. 4, in some embodiments of the present disclosure, the angle α between the support plate 200 and the shape-copying plate 100 is 90°±10°. That is, the support plate 200 is substantially perpendicular to the shape-copying plate 100.

It should be appreciated that, a thickness of the shape-copying plate 100 is determined according to the inner space of the curved-surface cover plate 20. For example, in some embodiments of the present disclosure, the thickness of the shape-copying plate 100 is about 4.4 mm. The elastic buffer layer 300 on the shape-copying curved surface of the shape-copying plate 100 is made of silica gel, and it is arranged on the entire outer surface of the shape-copying plate 100 so as to achieve a buffering effect through the deformation of the elastic buffer layer.

Furthermore, in some embodiments of the present disclosure, as shown in FIGS. 4 to 8, a through hole 150 penetrating through the support plate 200 is formed at a position where the shape-copying plate 100 is connected to the support plate 200, and when the bearing film 400 is spread out on the shape-copying curved surface of the shape-copying plate, one end of the bearing film 400 passes through the through hole 150 and spreads out on the first shape-copying plane 100.

Based on the above, when the bearing film 400 is spread out on the attachment slider, one end of the bearing film 400 passes through the through hole 150, and is clamped and fixed by a first clamping member 500, and the other end of the bearing film 400 bypasses the first shape-copying plane 110, the first shape-copying arc surface 130 and the second shape-copying plane 120, and is clamped and fixed by a second clamping member 600. Hence, the bearing film 400 supported on the first shape-copying plane 110 is pulled by a horizontal force, so it is able to reduce a gap between the bearing film 400 and the attachment slider, thereby to prevent the attachment slider from being in contact with the bearing film 400 in advance, prevent an adhesive material from being peeled off, and achieve the alignment.

It should be appreciated that, a width of the through hole 150 is determined according to a width of the bearing film 400, and it is slightly greater than the width of the bearing film 400. A height of the through hole 150 in a direction perpendicular to the first shape-copying plane 110 is determined according to a thickness of the bearing film 400, for example, the height of the through hole 150 in the direction perpendicular to the first shape-copying plane 110 is about 0.8 mm.

Furthermore, in some embodiments of the present disclosure, the support plate 200 is provided with a plurality of connection holes (not shown) through which the support plate is coupled to a driving mechanism for driving the support plate 200 to move. The driving mechanism is configured to drive the attachment slider to move along a straight trajectory and an arc trajectory.

Figure 8:
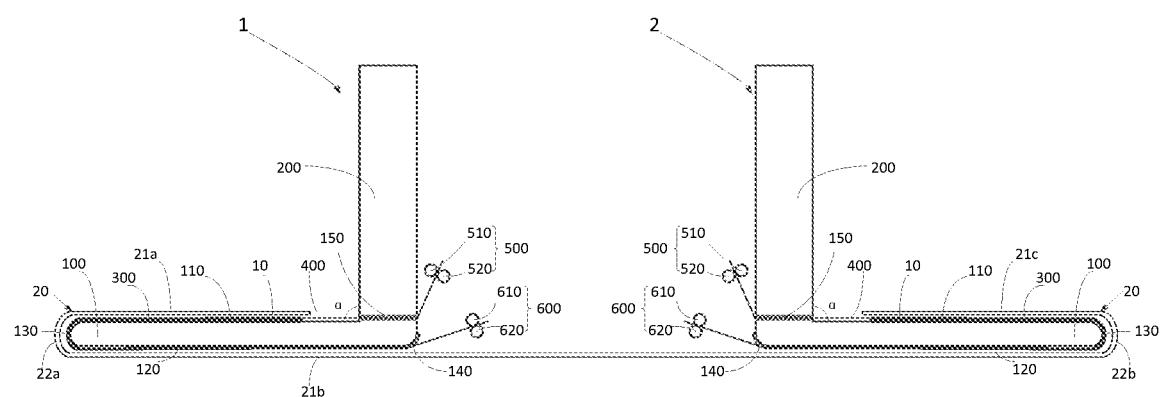
FIG. 8 a schematic view showing a situation where the attachment slider is attached to the surround screen in FIG. 3 according to one embodiment of the present disclosure.

In addition, it should be further appreciated that, in actual use, the quantity of the attachment sliders may be one or two. For example, for a 3600 surround screen in FIG. 3, as shown in FIG. 8, it has a semi-circular arc surface at either side, and at this time, one attachment slider is used, i.e., it is attached to the arc surface at one side and then attached to the arc surface at the other side. Alternatively, two attachment sliders are used, one is attached to the first arc surface at one side and the other is attached to the second arc surface at the other side. Alternatively, for a 360° surround screen in FIG. 3, the quantity of the shape-copying plates 100 in the attachment slider may be two, namely, one shape-copying plate is at either side of the support plate, and the attachment slider has a T-shaped structure.

Figure 7:
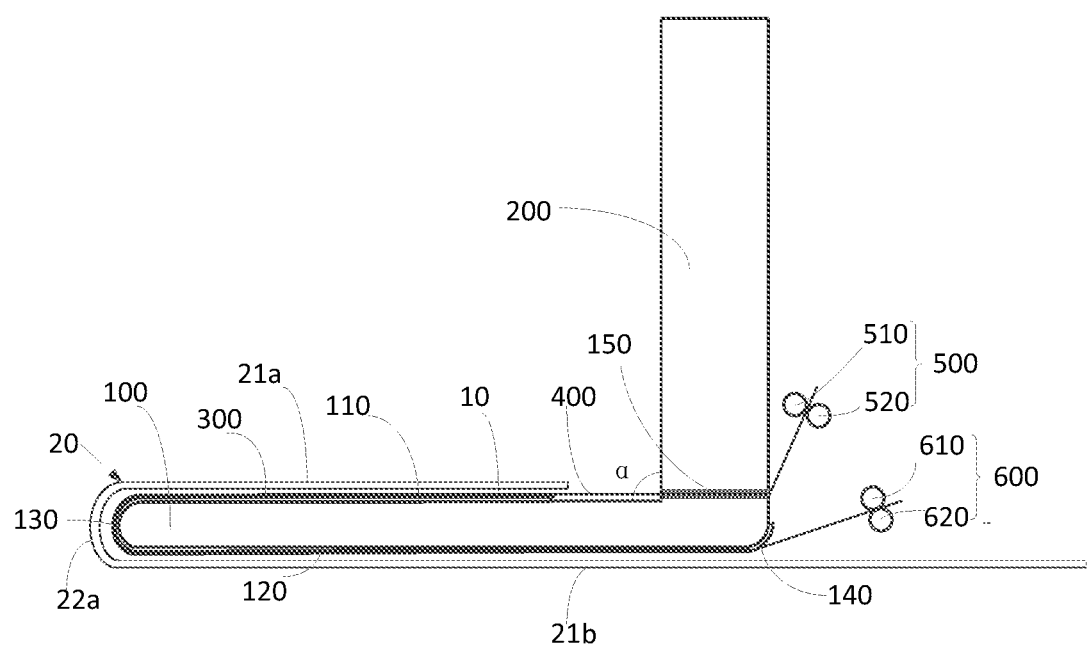
FIG. 7 is a schematic view showing a situation where the attachment slider is attached to the surround screen in FIG. 2 according to one embodiment of the present disclosure.

The present disclosure further provides in some embodiments an attachment device for attaching a flexible display panel 10 to a curved-surface cover plate 20. As shown in FIGS. 6 to 8, the attachment device includes a bearing film 400, a cover plate bearing member, the above-mentioned attachment slider and a driving mechanism. The flexible display panel 10 is attached to one surface of the bearing film 400, the surface to which the flexible display panel 10 is attached faces an inner surface of the curved-surface cover plate 20, and a surface to which the flexible display panel 10 is not attached is in contact with a shape-copying curved surface of the attachment slider. The bearing film 400 is spread out on the shape-copying curved surface. The cover plate bearing member is not shown in the figures, and it is configured to bear and fix the curved-surface cover plate 20. The driving mechanism is not shown in the figures, and it is configured to drive the attachment slider to move. The driving mechanism drives the attachment slider to move along a straight trajectory and an arc trajectory.

In some embodiments of the present disclosure, the shape-copying curved surface of the shape-copying plate 100 includes a first shape-copying plane 110 and a second shape-copying plane 120 arranged opposite to each other, and a first shape-copying arc surface 130 connected between the first shape-copying plane 110 and the second shape-copying plane 120. A through hole 150 penetrating through the support plate 200 is formed at a position where the shape-copying plate 100 is connected to the support plate 200, the bearing film 400 supported on the first shape-copying plane 110 extends through the through hole 150, the flexible display panel 10 is attached to the bearing film 400, and the through hole 150 is configured in such a manner that the bearing film 400 spreads out on the first shape-copying plane 110 after passing through the through hole 150.

The attachment device further includes a first clamping member 500 and a second clamping member 600.

The bearing film 400 includes a feeding end and a receiving end, the bearing film 400 is configured to be spread out and supported on the shape-copying curved surface of the shape-copying plate 100, the feeding end extends through the through hole 150 and is clamped by the first clamping member 500, and the receiving end is clamped by the second clamping member 600.

Based on the above, when the bearing film 400 is spread out on the attachment slider, one end of the bearing film 400 passes through the through hole 150, and is clamped and fixed by the first clamping member 500. The other end of the bearing film 400 bypasses the first shape-copying plane 110, the first shape-copying arc surface 130 and the second shape-copying plane 120, and is clamped and fixed by the second clamping member 600. Hence, the bearing film 400 supported on the first shape-copying plane 110 is pulled by a horizontal force, so it is able to reduce a gap between the bearing film 400 and the attachment slider, thereby to prevent the attachment slider from being in contact with the bearing film 400 in advance, prevent an adhesive material from being peeled off, and achieve the alignment.

It should be appreciated that, ach of the first clamping member 500 and the second clamping member 600 has a double-roller clamping structure. For example, as shown in FIG. 6, the first clamping member 500 includes a first clamping roller 510 and a second clamping roller 520, the feeding end of the bearing film 400 passes through between the first clamping roller 510 and the second clamping roller 520. The second clamping member 600 includes a third clamping roller 610 and a fourth clamping roller 620, and the receiving end of the bearing film 400 passes through between the third clamping roller 610 and the fourth clamping roller 620. In this way, the bearing film 400 is clamped and fixed by the clamping rollers, and meanwhile moves between the clamping rollers to convey the flexible display panel 10 on the bearing film 400 during the sliding of the attachment slider.

In addition, it should be further appreciated that, in actual use, the quantity of the attachment sliders may be one or two. For example, for a 360° surround screen in FIG. 3, as shown in FIG. 8, it has a semi-circular arc surface at either side, and at this time, one attachment slider is used, i.e., it is attached to the arc surface at one side and then attached to the arc surface at the other side. Alternatively, two attachment sliders are used, one is attached to the first arc surface at one side and the other is attached to the second arc surface at the other side.

The present disclosure further provides in some embodiments an attachment method for attaching a flexible display panel 10 to a curved-surface cover plate 20 through the above-mentioned attachment device. The attachment method includes the following steps.

Step S01: enabling the curved-surface cover plate 20 to be born and fixed on a cover plate bearing member.

Step S02: enabling the bearing film 400 to which the flexible display panel 10 is attached to be spread out and supported on the shape-copying curved surface of the shape-copying slider.

Step S03: aligning the shape-copying slider with the curved-surface cover plate 20 so that a surface of the bearing film 400 to which the flexible display panel 10 is attached faces an inner surface of the curved-surface cover plate 20.

Step S04: controlling the shape-copying slider to move so that the flexible display panel 10 is attached to the curved-surface cover plate 20.

For ease of understanding, the attachment method will be described hereinafter in more details.

Taking the surround screen in FIG. 6 as an example, in the attachment method, in some embodiments of the present disclosure, Step S04 specifically includes the following steps.

Step S041: an initial position of the attachment slider is located in the middle of the second planar region 21*b*, and the attachment slider is controlled to be translated along a first linear direction to the first curved region 22*a* on the curved-surface cover plate 20, until the flexible display panel is attached to a part of the second planar region 21*b* of the curved-surface cover plate 20 adjacent to the first curved region 22*a*. The first linear direction is parallel to the second planar region 21*a*.

Step S042: the attachment slider is controlled to move along an arc trajectory from the bottom to the top of the first curved region 22*a* until the flexible display panel is attached to the first curved region 22*a* of the curved-surface cover plate 20.

Step S043: the attachment slider is controlled to be translated along the first linear direction to be away from the first curved region 22*a* of the curved-surface cover plate 20 until the flexible display panel is attached to the first planar region 21*a* of the curved-surface cover plate 20.

Step S044: the attachment slider is controlled to return to the initial position, and the attachment slider is controlled to be translated along the first linear direction close to the second arc region 22*b* of the curved-surface cover plate 20 until the flexible display panel is attached to a part of the second planar region 21*b* of the curved-surface cover plate 20 adjacent to the second curved region 22*b*.

Step S045: the attachment slider is controlled to move along an arc trajectory from the bottom to the top of the second curved region 22*b* until the flexible display panel is attached to the second curved region 22*b* of the curved-surface cover plate 20.

Through the movement of the attachment slider, it is able to prevent the occurrence of such defects as bubbles. When the flexible display panel is attached to the curved region of the curved-surface cover plate 20 from the bottom to the top, it is able to prevent the occurrence of bubbles.

It should be appreciated that, the above is merely for illustrative purposes. In actual use, the flexible display panel is attached to the second curved region 22*b* and then to the first curved region 22*a*.

Taking the surround screen in FIG. 7 as an example, in the attachment method, in some embodiments of the present disclosure, Step S04 specifically includes the following steps.

Step S041: an initial position of the attachment slider is located at one end of the second planar region 21*b* away from the first curved region 22*a*, and the attachment slider is controlled to be translated along a first linear direction to the first curved region 22*a* of the curved-surface cover plate 20 until the flexible display panel is attached to the second planar region 21*b* of the curved-surface cover plate 20. The first linear direction is parallel to the second planar region 21*a*.

Step S042: the attachment slider is controlled to move along an arc trajectory from the bottom to the top of the first curved region 22a until the flexible display panel is attached to the first curved region 22a of the curved-surface cover plate 20.

Step S043: the attachment slider is controlled to be translated along the first linear direction to be away from the first curved region 22a of the curved-surface cover plate 20 until the flexible display panel is attached to the first planar region 21a of the curved-surface cover plate 20.

It should also be appreciated that, in practical use, for a 3600 surround screen, the curved-surface cover plate 20 includes a first planar region 21a, a second planar region 21b and a third planar region 21 parallel to each other, and a first curved region 22a and a second curved region 22b arranged opposite to each other. Each of the first ac curved region 22a and the second curved region 22b has a semi-circular arc surface, a major-arc surface, a semi-circular elliptical surface or a major-arc elliptical surface. In the attachment method, during the attachment, two attachment sliders, a first attachment slider 1 and a second attachment slider 2, are provided.

As shown in FIG. 8, in Step S04, the first attachment slider is attached to the first curved region 22a, and the second attachment slider is attached to the second curved region 22b.

For example, Step S04 specifically includes the following steps.

Step S041: an initial position of the first attachment slider 1 is located in the middle of the second planar region 21b, and the first attachment slider 1 is controlled to be translated along a first linear direction to the first curved region 22a of the curved-surface cover plate 20, until the flexible display panel is attached to a part of the second planar region 21b of the curved-surface cover plate 20 adjacent to the first curved region 22a. In addition, an initial position of the second attachment slider 2 is located in the middle of the second planar region 21b, and the second attachment slider 2 is controlled to be translated along the first linear direction to the second curved region 22b of the curved-surface cover plate 20, until the flexible display panel is attached to a part of the second planar region 21b of the curved-surface cover plate 20 adjacent to the second curved region 22b.

Step S042: the first attachment slider 1 is controlled to move along an arc trajectory from the bottom to the top of the first curved region 22a until the flexible display panel is attached to the first curved region 22a of the curved-surface cover plate 20. In addition, the second attachment slider 2 is controlled to move along an arc trajectory from the bottom to the top of the second arc surface area 22b until the flexible display panel is attached to the second curved region 22b of the curved-surface cover plate 20.

Step S043: the first attachment slider 1 is controlled to be translated along the first linear direction to be away from the first curved region 22a of the curved-surface cover plate 20 until the flexible display panel is attached to the first planar region 21a of the curved-surface cover plate 20. In addition, the second attachment slider 2 is controlled to be translated along the first linear direction to be away from the second curved region 22b of the curved-surface cover plate 20 until the flexible display panel is attached to the third planar region 21 of the curved-surface cover plate 20.

Some description will be given as follows.

(1) The drawings merely relate to structures involved in the embodiments of the present disclosure, and the other structures may refer to those known in the art.

(2) For clarification, in the drawings for describing the embodiments of the present disclosure, a thickness of a layer or region is zoomed out or in, i.e., these drawings are not provided in accordance with an actual scale. It should be appreciated that, in the case that such an element as layer, film, region or substrate is arranged "on" or "under" another element, it may be directly arranged "on" or "under" the other element, or an intermediate element may be arranged therebetween.

(3) In the case of no conflict, the embodiments of the present disclosure and the features therein may be combined to acquire new embodiments.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. An attachment slider for attaching a flexible display panel to a curved-surface cover plate, comprising:
    at least one rigid shape-copying plate, at least a portion of an outer surface of the shape-copying plate being a shape-copying curved surface through which the flexible display panel copies a shape of the curved-surface cover plate, an elastic buffer layer being provided on the shape-copying curved surface; and
    at least one rigid support plate attached to the shape-copying plate, the support plate being angled relative to the shape-copying plate by an angle,
    wherein the support plate is provided with a connection hole through which the support plate is connected to a driving mechanism for driving the support plate to move.

2. The attachment slider according to claim 1, wherein the shape-copying curved surface of the shape-copying plate comprises a first shape-copying plane and a second shape-copying plane arranged opposite to each other, and a first shape-copying arc surface connected between the first shape-copying plane and the second shape-copying plane.

3. The attachment slider according to claim 2, wherein the first shape-copying arc surface is a semi-circular arc surface, a semi-elliptical arc surface, a major-arc surface or a major-arc elliptical surface.

4. The attachment slider according to claim 3, wherein the shape-copying curved surface of the shape-copying plate further comprises a second shape-copying arc surface at an edge of the second shape-copying plane away from the first shape-copying arc surface.

5. The attachment slider according to claim 4, wherein the second shape-copying arc surface is a minor-arc surface or a minor-arc elliptical surface.

6. The attachment slider according to claim 2, wherein the support plate is connected to the first shape-copying plane and is formed integrally with the shape-copying plate.

7. The attachment slider according to claim 2, wherein an angle between the support plate and the shape-copying plate is 90°±10°.

8. The attachment slider according to claim 6, wherein a through hole penetrating through the support plate is formed at a position where the shape-copying plate is connected to the support plate, and when a bearing film is spread out on the shape-copying curved surface of the shape-copying plate, one end of the bearing film passes through the through hole and spreads out on the first shape-copying plane.

9. An attachment device for attaching a flexible display panel to a curved-surface cover plate, comprising:
a bearing film, the flexible display panel being attached onto one surface of the bearing film;
a cover plate bearing member configured to bear and fix the curved-surface cover plate;
an attachment slider comprising at least one rigid shape-copying plate, at least a portion of an outer surface of the shape-copying plate being a shape-copying curved surface through which the flexible display panel copies a shape of the curved-surface cover plate, an elastic buffer layer being provided on the shape-copying curved surface; and at least one rigid support plate attached to the shape-copying plate, the support plate being angled relative to the shape-copying plate by an angle; and
a driving mechanism for driving the attachment slider to move.

10. The attachment device according to claim 9, wherein the shape-copying curved surface of the shape-copying plate comprises a first shape-copying plane and a second shape-copying plane arranged opposite to each other, and a first shape-copying arc surface connected between the first shape-copying plane and the second shape-copying plane;
a through hole penetrating through the support plate is formed at a position where the shape-copying plate is connected to the support plate, the bearing film supported on the first shape-copying plane extends through the through hole, the flexible display panel is attached to the bearing film, and the bearing film spreads out on the first shape-copying plane after passing through the through hole; and
the attachment device further comprises a first clamping member and a second clamping member, the bearing film comprises a feeding end and a receiving end, the bearing film is configured to be spread out and supported on the shape-copying curved surface of the shape-copying plate, the feeding end extends through the through hole and is clamped by the first clamping member, and the receiving end is clamped by the second clamping member.

11. An attachment method for attaching a flexible display panel to a curved-surface cover plate using the attachment device according to claim 9, comprising:
enabling the curved-surface cover plate to be born and fixed on a cover plate bearing member;
enabling the bearing film to which the flexible display panel is attached on a shape-copying curved surface of a shape-copying slider;
aligning the shape-copying slider with the curved-surface cover plate so that a surface of the bearing film to which the flexible display panel is attached faces an inner surface of the curved-surface cover plate; and
controlling the shape-copying slider to move so that the flexible display panel is attached to the curved-surface cover plate.

12. The attachment device according to claim 9, wherein the shape-copying curved surface of the shape-copying plate comprises a first shape-copying plane and a second shape-copying plane arranged opposite to each other, and a first shape-copying arc surface connected between the first shape-copying plane and the second shape-copying plane.

13. The attachment device according to claim 12, wherein the first shape-copying arc surface is a semi-circular arc surface, a semi-elliptical arc surface, a major-arc surface or a major-arc elliptical surface.

14. The attachment device according to claim 13, wherein the shape-copying curved surface of the shape-copying plate further comprises a second shape-copying arc surface at an edge of the second shape-copying plane away from the first shape-copying arc surface.

15. The attachment device according to claim 14, wherein the second shape-copying arc surface is a minor-arc surface or a minor-arc elliptical surface.

16. The attachment device according to claim 12, wherein the support plate is connected to the first shape-copying plane and is formed integrally with the shape-copying plate.

17. The attachment device according to claim 12, wherein an angle between the support plate and the shape-copying plate is 90°±10°.

18. The attachment device according to claim 16, wherein a through hole penetrating through the support plate is formed at a position where the shape-copying plate is connected to the support plate, and when a bearing film is spread out on the shape-copying curved surface of the shape-copying plate, one end of the bearing film passes through the through hole and spreads out on the first shape-copying plane.

19. The attachment device according to claim 9, wherein the support plate is provided with a connection hole through which the support plate is connected to a driving mechanism for driving the support plate to move.

* * * * *